United States Patent [19]

Suzuki et al.

[11] Patent Number: 5,455,947
[45] Date of Patent: Oct. 3, 1995

[54] LOG FILE CONTROL SYSTEM IN A COMPLEX SYSTEM

[75] Inventors: Hitoshi Suzuki; Koichi Shiga, both of Kawasaki, Japan

[73] Assignee: Fujitsu Limited, Kawasaki, Japan

[21] Appl. No.: 68,181

[22] Filed: May 28, 1993

[30] Foreign Application Priority Data

May 28, 1992 [JP] Japan .................... 4-135451

[51] Int. Cl.⁶ .................................................. G06F 17/40
[52] U.S. Cl. ................ 395/650; 395/600; 364/281.8; 364/716.1
[58] Field of Search ................... 395/600, 325, 395/650

[56] References Cited

U.S. PATENT DOCUMENTS

| | | | |
|---|---|---|---|
| 4,159,517 | 6/1979 | Paradine et al. | 395/250 |
| 4,507,751 | 3/1985 | Gawlick et al. | 395/575 |
| 4,715,045 | 12/1987 | Lewis et al. | 375/58 |
| 4,720,784 | 1/1988 | Radhakrishnan et al. | 364/200 |
| 4,722,043 | 1/1988 | Nagamine et al. | 364/147 |
| 5,185,887 | 2/1993 | Takahashi et al. | 395/600 |
| 5,239,646 | 8/1993 | Kimura | 395/575 |
| 5,247,672 | 9/1993 | Mohan | 395/650 |
| 5,321,750 | 6/1994 | Nadan | 380/20 |

FOREIGN PATENT DOCUMENTS

| | | |
|---|---|---|
| 63-98764 | 4/1988 | Japan . |
| 63-217442 | 9/1988 | Japan . |
| 2-128247 | 5/1990 | Japan . |

*Primary Examiner*—Thomas G. Black
*Assistant Examiner*—Peter Y. Wang
*Attorney, Agent, or Firm*—Staas & Halsey

[57] ABSTRACT

A log file control system is used in a complex system which includes a plurality of computer systems connected for communications. Additionally, the complex system includes a data base which is shared among the computer systems and a high-speed storage unit which is also shared among the computer systems. Further, a saving unit is present in each of the computer systems for saving log data, outputted by a transaction processed in the computer system, in a backout file for the computer system. A serializing unit in each of the computer systems exclusively obtains a log data buffer of the complex system, according to an inter-system exclusive control table, and transmits the serialized log data to the log data buffer. When the log data buffer issues a request for transmitting the data to a log file, an accumulating unit in the computer system transmits the data according to the request from the log data buffer. The log data is requested to be transmitted to the log file asynchronously with the transaction processes.

7 Claims, 9 Drawing Sheets

LOG FILE CONTROL SYSTEM IN A COMPLEX SYSTEM

BACKGROUND OF THE INVENTION

1. Field of the Invention

The present invention relates to a log file control system used in a complex system for controlling log data of a data base shared among a plurality of computer systems, and more specifically to a log file control system for use in a complex system for controlling a log file such that each computer system performs a high-speed transaction.

2. Description of the Related Art

A complex system refers to a system consisting of a plurality of computer systems connected to one another via communication lines. Each of the computer systems forming the complex system may be hereinafter referred to as a cluster. Diversified and large-scale computer systems have enabled such complex systems to be widely utilized in many fields in industry.

When resources are shared in a complex system, one cluster is kept waiting if another cluster is using the shared resources. The wait for a transaction causes a delay in data processing. Accordingly, a complex system should be designed such that a wait for a transaction can be as short as possible.

Conventionally, when a data base is shared in a complex system, an accumulation file (log file) containing log data, that is, updated data of the data base, is provided for each cluster.

Lately, when a data base is shared in a complex system it can be accessed by only one cluster through a reserve release which is a hardware mechanism. When a log file is shared in a complex system, the file is expected to be accessed by only one cluster, as in the above described method of sharing a data base, through a reserve release by a hardware mechanism. However, in such a configuration, an exclusive lock control is performed in units of volume and the transactions of clusters to which access cannot be made are kept waiting, resulting in poor efficiency in processing transactions in the entire system.

Then, when a data base is shared conventionally in a complex system, a log file is provided for each cluster so that delays will not be caused by a waiting state due to the exclusive control.

According to Japanese Patent Application No. Tokugan-Hei 3-289031 (titled "Inter-system Exclusive Control Method"), the above-recited invention has disclosed that shared resources are not controlled in a large-volume unit, but in a smaller exclusive unit according to an exclusion table, provided in a semiconductor storage unit in a complex system, for controlling shared resources. The invention does not utilize the conventional reserve release by a hardware mechanism.

According to the above-recited invention, a data base can be controlled in a block-exclusive unit when the data base is shared in a complex system. That is, when a block of the data base is being updated during a transaction in the computer system, all the other transactions in the complex system cannot update the block until the current transaction has finished its process. Actually, if a transaction tries to update a block being updated by another transaction, it is kept waiting until the updating transaction has finished with the block.

Thus, even with the conventional configuration containing a log file for each cluster, the above-recited invention reduces the exclusive or locking unit of a shared data base, the exclusive or locking operation being reduced more than in an exclusive or locking operation performed in units of a volume. This results in a great improvement towards complete solving the problem of waiting for transactions.

However, if a log file is provided for each cluster as in a conventional method, then the invention requires the rearrangements of log data generated by clusters in sequence of their generation among the clusters, thereby requiring quite a complicated recovery process. Therefore, the performance is reduced considerably in processing transactions. Thus, complete transactions cannot be processed at a high speed.

SUMMARY OF THE INVENTION

The present invention aims at providing a system of controlling log data in a shared data base so that each computer system in a complex system can process transactions at a high speed.

The present invention is based on a complex system comprising a plurality of computer systems each having a high-speed storage unit providing high-speed access using a semiconductor memory, a CPU, and a main storage, and sharing the high-speed storage unit and a data base among a plurality of the computer systems. Each of the computer systems in the complex system processes transactions by accessing and updating the shared data base.

Then, each computer system comprises a backout file for temporarily storing log data for the shared data base which are generated in a transaction at the end of each transaction.

It also comprises, in the high-speed storage unit, a log data buffer for receiving log data temporarily stored in the backout file and temporarily storing log data in the high-speed storage unit.

Furthermore, it comprises, in the high-speed storage unit, an inter-system exclusive control table to be used in controlling the exclusive access to the log data buffer when the log data stored in the backout file are transmitted to the log data buffer.

Then, a plurality of the computer systems have a shared log file for storing the log data temporarily stored in the log data buffer.

Each of the computer systems forming the complex system comprises a log file control unit for controlling -the log file, the backout file, the log data buffer and the inter-system exclusive control table in the high-speed storage unit, the temporary storage of the log data in the backout file, and the temporary storage of the log data in the backout file in the log data buffer, and for transmitting the log data to the log file asynchronously with the transaction in the computer system or the cluster.

In the above described configuration of the present invention, the log file control unit comprises a serializing unit for saving, in a backout file log, data generated during a transaction process, exclusively accessing the log data buffer according to the inter-system exclusive control table, and then transmitting the log data to the exclusively-accessed log data buffer. The serializing unit stores in the log data buffer log data transmitted from a plurality of computer systems and arranged in time sequence after the log data buffer has been exclusively accessed according to the inter-system exclusive control table. Furthermore, the serializing unit saves log data in a backout file, finishes a transaction process from which the log data has been outputted, and then is ready to start another transaction process.

In addition, the log file control unit comprises an accumulating unit for transmitting log data in a log data buffer to the log file if any buffer becomes full in the log data buffer when the serializing unit transmits log data to the log data buffer. The accumulating unit can transmit log data to a log file asynchronously with the following transaction process in its own computer system or a transaction in other computer systems in the complex system.

According to the above described configuration of the present invention, log data stored in the log data buffer can be serialized before the log data is stored in the log file and thus, the transaction wait time caused by an inter-cluster exclusion process on the log file can be greatly reduced by using the log data buffer and the inter-system exclusion control table and by using a small unit of log data such as a block data as a unit of an exclusive lock control when a log file is shared in a complex system. Consequently, a high-speed transaction process can be realized.

Furthermore, log files can be written asynchronously with a transaction process performed by each computer system by writing log data from a log data buffer to a log file only when the log buffer becomes full. Thus, the overhead of a transaction caused by sharing the log file among clusters can be reduced, and a high-speed transaction process can be realized.

As described above, the saving unit completes a first transaction by saving log data in the backout file, thereby enabling a second transaction to be started without waiting until the log data corresponding to the first transaction is stored in the log file. Therefore, the complex computer system can operate faster. The accumulating unit transmits log data from the log data buffer to the log file independently and asynchronously with transaction processes. Accordingly, log files can be maintained without interrupting the transaction processing of each computer system. Further, the log file can be accessed by a plurality of computer systems without suffering from a busy and a confliction state. The serializing unit serializes log data transmitted by a plurality of computer systems by transmitting the log data after exclusively obtaining the log data buffer according to the inter-system control table. Therefore, it is not necessary to serialize the log data in the log file, thereby speeding up an operation of the complex computer system.

In addition to the above described configuration, the present invention comprises a fault monitoring unit, provided in each computer system forming the complex system, for monitoring faults arising in other computer systems in the complex system and performing a recovery process on log data stored in the faulty computer systems when each fault has been detected.

Besides, the present invention requires no conventional log operations specific to a complex system, and easily operates a complex system as if it were a single computer system.

BRIEF DESCRIPTION OF THE DRAWINGS

The objects and features of the present invention can be easily recognized by referring to the attached drawings and the description of the preferred embodiments of the present invention.

DESCRIPTION OF THE PREFERRED EMBODIMENTS

EXPLANATION OF THE PRINCIPLE

Figure 1:
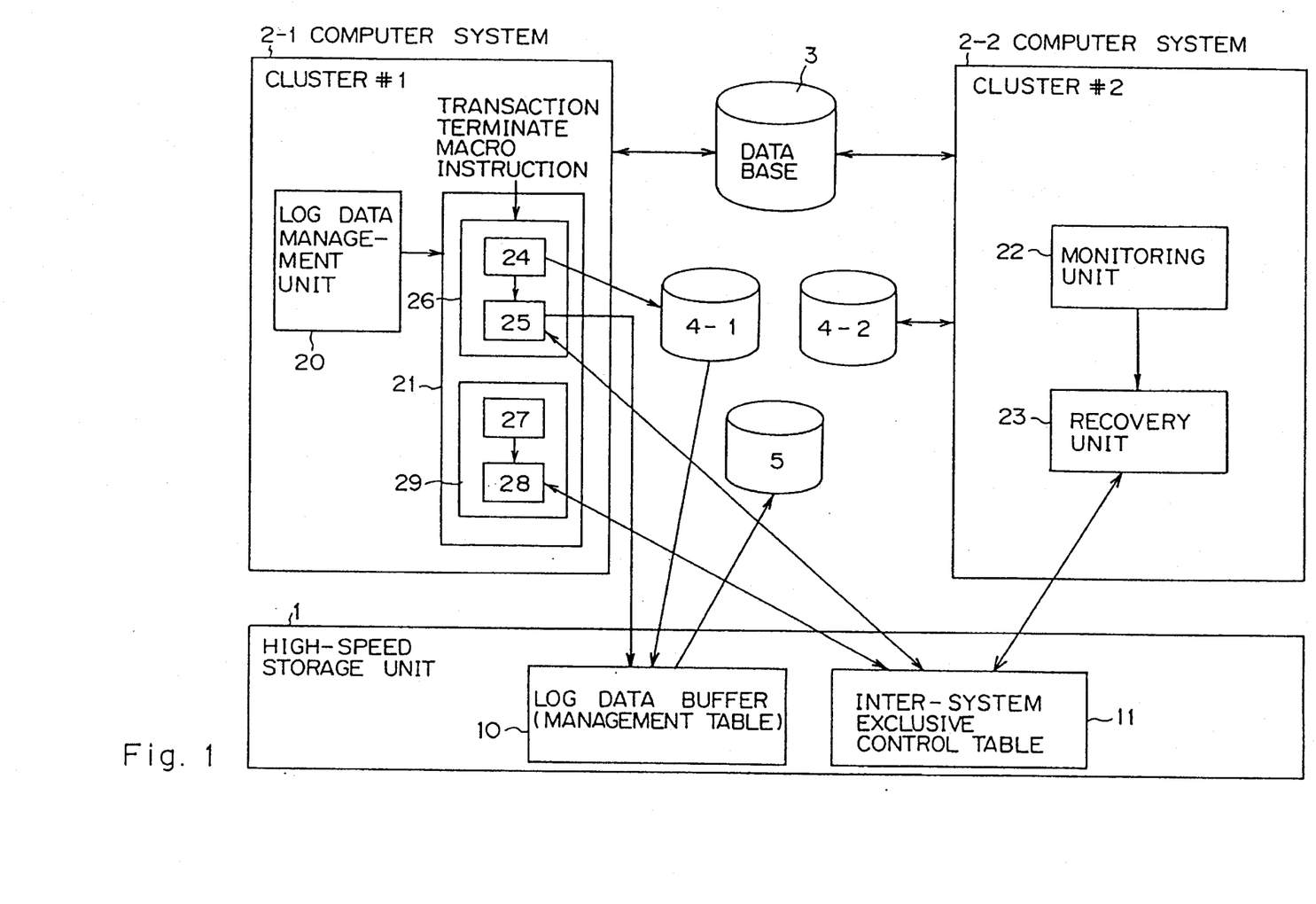
FIG. 1 is a block diagram for explaining the principle of the present invention.

FIG. 1 is a block diagram for explaining the principle of the present invention. The present invention is designed on the premise that a complex system comprises a high-speed storage unit 1 realizing high-speed access using a semiconductor memory, computer systems 2-$i$ ($i$=1, 2) having a CPU and a main storage for sharing the high-speed storage unit 1, and a data base 3 shared among the computer systems 2-$i$. The block diagram for explaining the principle of the present invention shows two computer systems 2-$i$ ($i$=1, 2) for convenience, and the number of the computer systems is not limited to that in this application, but instead can be greater than two.

Backout files 4-$i$ ($i$=1, 2) provided for each of the computer systems 2-$i$, temporarily store log data at the end of a transaction process.

A log data buffer 10 provided in the high-speed storage unit 1 receives log data temporarily stored in the backout file 4-$i$ provided for each of the computer systems 2-$i$, and temporarily stores them. The log data buffer 10 comprises a plurality of divided buffers.

An inter-system exclusive control table 11 provided in the high-speed storage unit 1 is used to control an exclusive right to use the log data buffer 10 when the log data stored in the backout file 4-$i$ are transmitted to the log data buffer 10.

A log file 5 provided such that it is shared between the computer systems 2-$i$ ($i$=1, 2) receives the log data stored in the log data buffer 10. The data base 3 is updated by the log data stored in the log file 5.

A log data management unit 20 provided in each of the computer systems 2-$i$ manages log data, that is, updating data for a data base outputted by a transaction process in an application program.

A log file control unit 21 provided in each of the computer systems 2-$i$ controls the log file 5. The log file control unit 21 comprises a serializing unit 26 having a saving unit 24 and a transmitting unit 25, and an accumulating unit 29 having a detecting unit 27 and a transmitting unit 28. The saving unit 24 in the serializing unit 26 saves, in the backout file 4-$i$, the log data controlled by the log data management unit 20. The transmitting unit 25 exclusively obtains the log data buffer 10 according to the inter-system exclusive control table 11, and transmits the log data managed by the log data management unit 20 to the exclusively-obtained log data buffer 10. The detecting unit 27, provided in the accumulating unit 29, detects the transmission request state of the log data buffer 10. The transmitting unit 28 obtains an exclusive right to use the log data buffer 10 when the detecting unit 27 detects a transmission request state, and transmits the log data in the exclusively-obtained log data buffer 10 to the log file 5.

A monitoring unit 22, provided in each of the computer systems 2-i, monitors faults arising in other computer systems 2.

A recovery unit 23, provided in each of the computer systems 2-i performs a recovery process on log data in the computer systems in fault when the monitoring unit 22 detects faults arising in other computer systems 2.

The above described configuration according to the principle of the present invention is explained as follows.

In each of the computer systems 2-i, for exclusively obtaining a record in a block in a shared data base, the saving unit 24 in the serializing block 26 saves the log data managed by the log data, management unit 20, in the backout file 4-i on completion of a transaction process in an application program, thus completing the transaction process. Then, the computer system 2-i is ready to start the next transaction process.

When the saving unit 24 saves log data in the backout file 4-i, the transmitting unit 25 of the serializing unit 26 exclusively obtains the log data buffer 10 by exclusively obtaining the inter-system exclusive control table 11. In addition, the transmitting unit 25 transmits the log data saved in the saving unit 24 to the exclusively-obtained log data buffer 10. During the transmission by the transmitting unit 25, the detecting unit 27 in the accumulating unit 29 determines whether or not there is a buffer in the log data buffer 10 comprising a plurality of divided buffers which becomes full by the transmission process.

As described later, the backout file 4-i is used to carry out again a log data transmission to the log data buffer 10 when the process is interrupted by a fault. Therefore, when log data are normally transmitted to the log data buffer 10 by the transmission unit 25, the log data saved in the backout file 4-i by the saving unit 24 is invalidated.

If the detecting unit 27 detects the transmission request state of the log data buffer 10 indicating that there is a full buffer, the transmitting unit 28 of the accumulating unit 29 exclusively obtains the log data buffer 10 by exclusively obtaining the inter-system exclusive control table 11 independently in asynchronizing with a transaction process, and transmits the log data specified by a transmission request indicator to the log file 5. Since the log data buffer 10 is provided with a management table used in managing written-to block numbers, etc. in the log file 5, that is, the destination of written log data, the transmitting unit 28 transmits the log data to the storage area in the log file 5 specified by a written-to block number. Thus, the log file 5 is exclusively accessed and, simultaneously, log data are transmitted to the log file 5.

In this process, if the monitoring unit 22 of the other computer system 2-i detects a fault in the computer system 2-i performing a process of transmitting log data to the log data buffer 10, it activates the recovery unit 23 of its own computer system 2-i. On receiving an activate instruction, the recovery unit 23 exclusively obtains the log data buffer 10 by exclusively obtaining the inter-system exclusive control table 11, reads log data stored in the backout file 4-i in the computer system 2-i in fault, and transmits them to the log data buffer 10, thereby performing a recovery process of log data.

As described above, each of the computer systems 2-i stores log data in the log data buffer 10 in time series ("serializing") by writing in the exclusively-obtained log data buffer 10 the log data generated by a transaction process. Simultaneously, it transmits, at an appropriate time the log data written in the log data buffer 10 to the log file 5 independently and asynchronously with a transaction process. Thus, the log file 5 can be shared among a plurality of computer systems 2-i.

At this time, the exclusive right to use the log file 5 can be realized by exclusively obtaining the inter-system exclusive control table 11 of the high-speed storage unit 1, not by using a reserve release by a hardware mechanism. Accordingly, the shared log file 5 can be accessed, not in large volume units, but in smaller block or record units. Thus, transactions can be processed efficiently.

Explanation of the Preferred Embodiments

The preferred embodiments of the present invention are explained by referring to the attached drawings.

Figure 2:
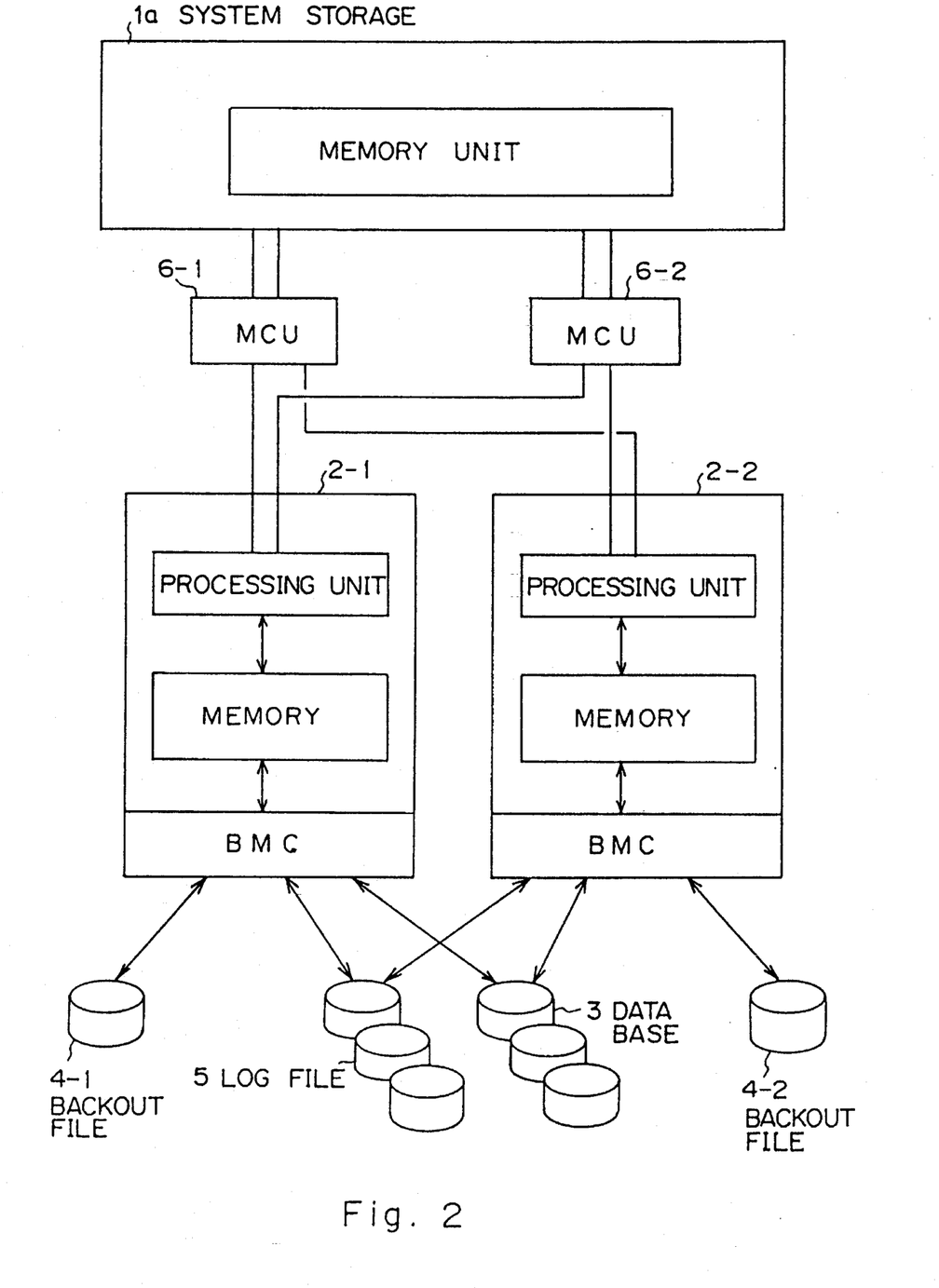
FIG. 2 shows a general configuration of a complex system according to an embodiment of the present invention.

FIG. 2 shows the general configuration of the complex system of a preferred embodiment. In FIG. 2, if a unit corresponds to one shown in FIG. 1, the same unit number is used.

As shown in FIG. 2, the complex system comprises, for example, two computer systems 2-i ($i=1$, 2), a system storage 1a, corresponding to the high-speed storage unit 1 shown in FIG. 1, shared between the computer systems 2-i, a data base 3 shared between the computer systems 2-i, a log file 5 shared between the computer systems 2-i, a backout file 4-i ($i=1$, 2) for temporarily storing log data, and a memory control unit MCU 6-i ($i=1$, 2), provided for each of the computer systems 2-i, for interfacing between the computer system 2-i and the system storage 1-a. Each of the computer systems 2-i comprises a processing unit, a memory, and a BMC for interfacing between the computer system and the backout file 4-i, the log file 5, and the data base 3.

Hereinafter, a back-out-file BOF stands for the data information relating to the backout file 4-i and a historical-log-file HLF for the data information relating to the log file 5 and the log data buffer 10.

Figure 3:
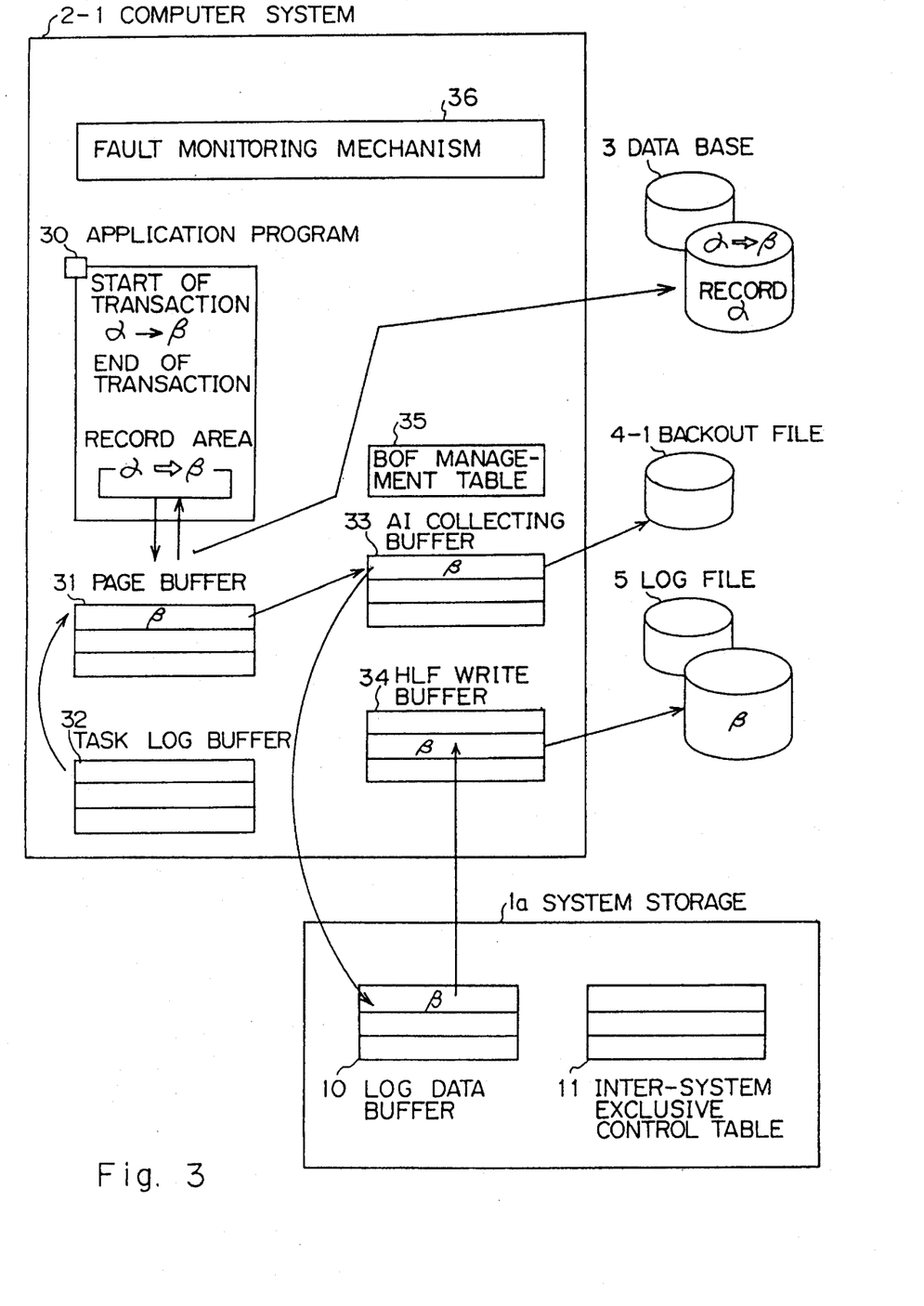
FIG. 3 shows the detailed configuration of the system according to the embodiment.

FIG. 3 shows the detailed configuration of the system of a preferred embodiment. In FIG. 3, as shown in FIG. 1, 10 is a log data buffer, and 11 is an inter-system exclusive control table.

The computer system 2-i comprises an application program 30, buffers containing a page buffer 31, a task log buffer 32, an after image (AI) collecting buffer 33, and an HLF write buffer 34, a BOF management table 35, and a monitor mechanism 36 for monitoring faults arising in the other computer system 2-i.

The page buffer 31 is a buffer obtained by the data base management system DBMS to store after-image data (log data) $\alpha$ of the data base 3. That is, when the DBMS receives a macro instruction from the application program to update the data base provided by itself, it stores updated data of the data base 3 updated by the application program 30.

The task log buffer 32 is a control table prepared for each task, which manages the positions of updated data received from the task.

Figure 4A:
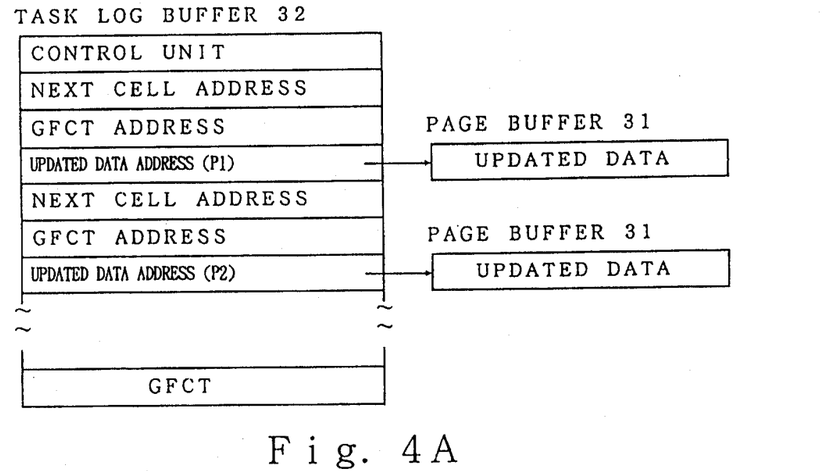
FIGS. 4A–4C show the contents of various tables.
Figure 4B:
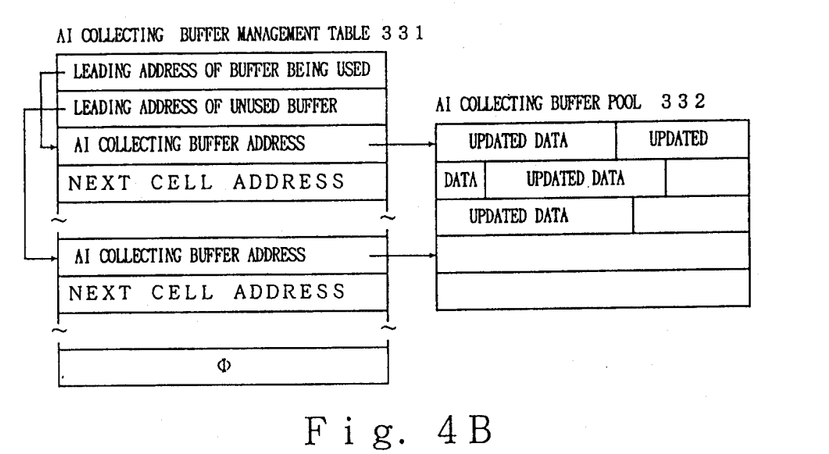
Figure 4C:
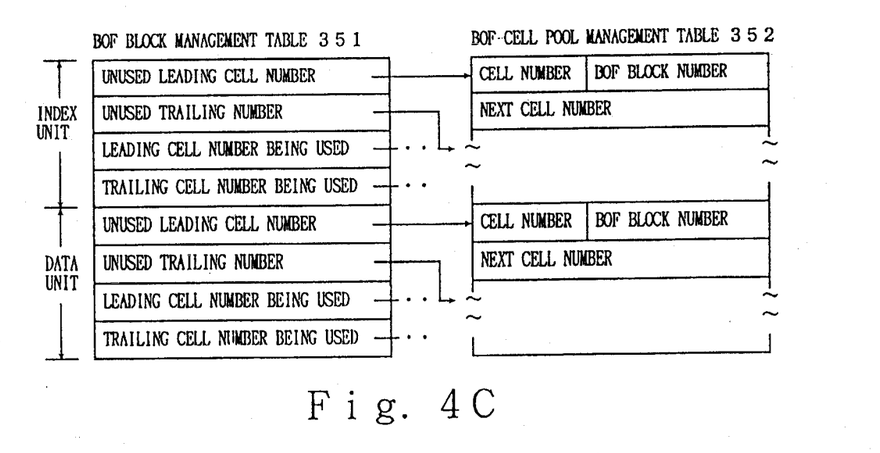

FIGS. 4–4C show the contents of various tables. As shown in FIG. 4A, the task log buffer 32 contains a plurality of entries. Each entry is used for managing an address of the next entry (next cell address), an address of a general field control table added to the head of updated data, and an address at which updated data are stored in the page buffer 31.

The AI collecting buffer 33 temporarily pools the updated data β collected from the page buffer 31 at the end of a transaction, and comprises an AI collecting buffer management table 331 and an AI collecting buffer pool 332 as shown in FIG. 4B. The AI collecting buffer management table 331 manages the use of the AI collecting buffer pool 332, while the AI collecting buffer pool 332 temporarily pools updated data collected from the page buffer 31 at the end of a transaction.

The AI collecting buffer management table 331 manages, for each header, the leading address in the buffer being used circularly by the AI collecting buffer pool 332 and the leading address in an unused address as shown in FIG. 4B. It contains a plurality of entries, through which it manages managing an address of the next cell (next cell address) and an address at which data are stored in the AI collecting buffer pool 332 (AI collecting buffer address).

The HLF write buffer 34 temporarily stores updated data transmitted from the log data buffer 10 in the system storage 1a to the log file 5.

The back out file BOF management table 35 manages the backout file 4-i, and contains a BOF block management table 351 and a BOF-cell pool management table 352 as shown in FIG. 4C.

The BOF block management table 351 is a header table for managing the use of the block in the backout file 4-i (comprising an index part and a data part as described later). The BOF-cell pool management table 352 contains a plurality of entries. Each entry manages the number of the next cell (next entry), that is, a next cell number, and the block number of the backout file 4-i. More specifically, the unused-block/block-in-use of the backout file 4-i can be specified by referring to the block number of the BOF-cell pool management table 352 designated by the BOF block management table 351.

Figure 5:
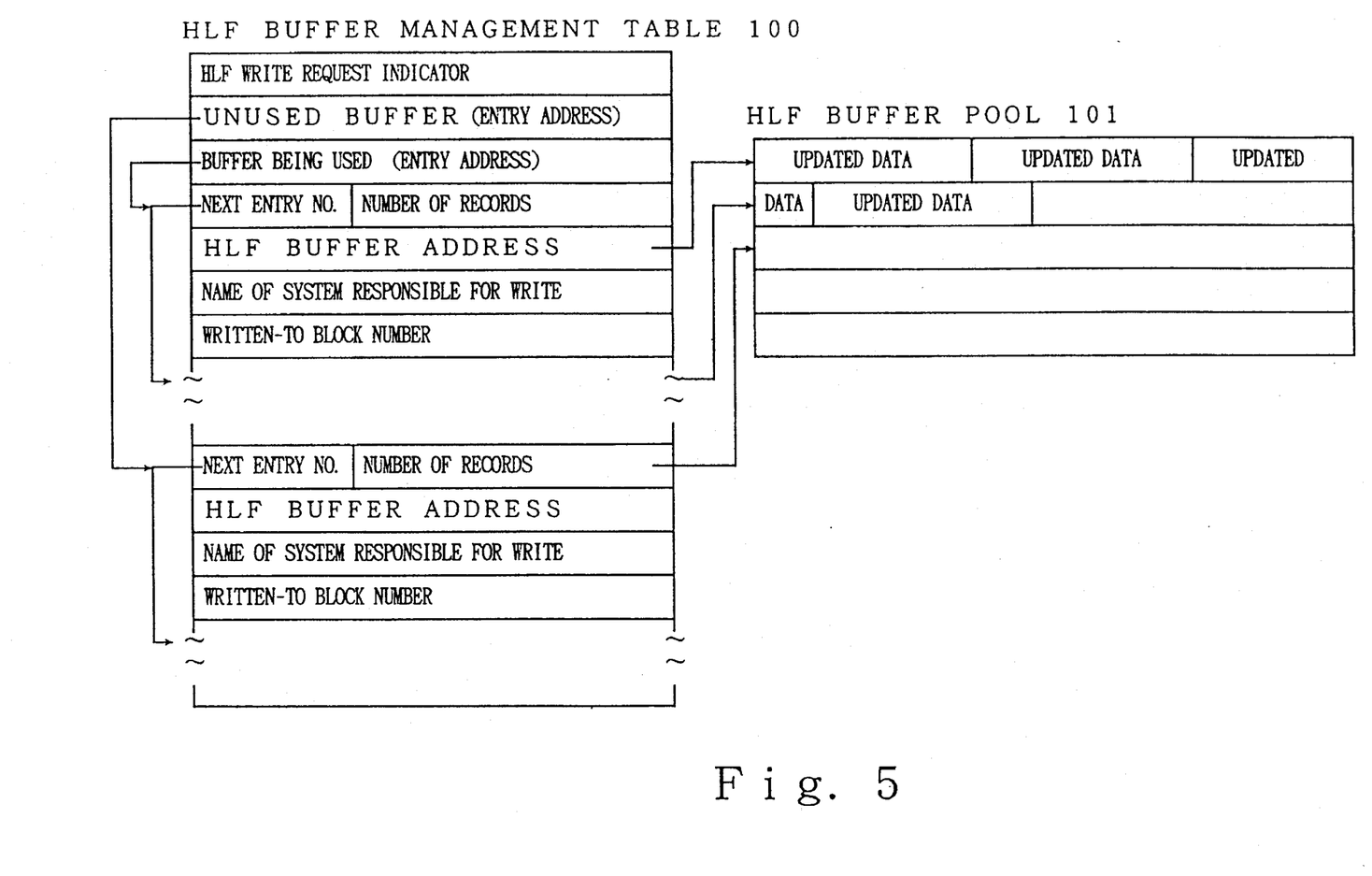
FIG. 5 shows the configuration of a log data buffer.
Figure 6:
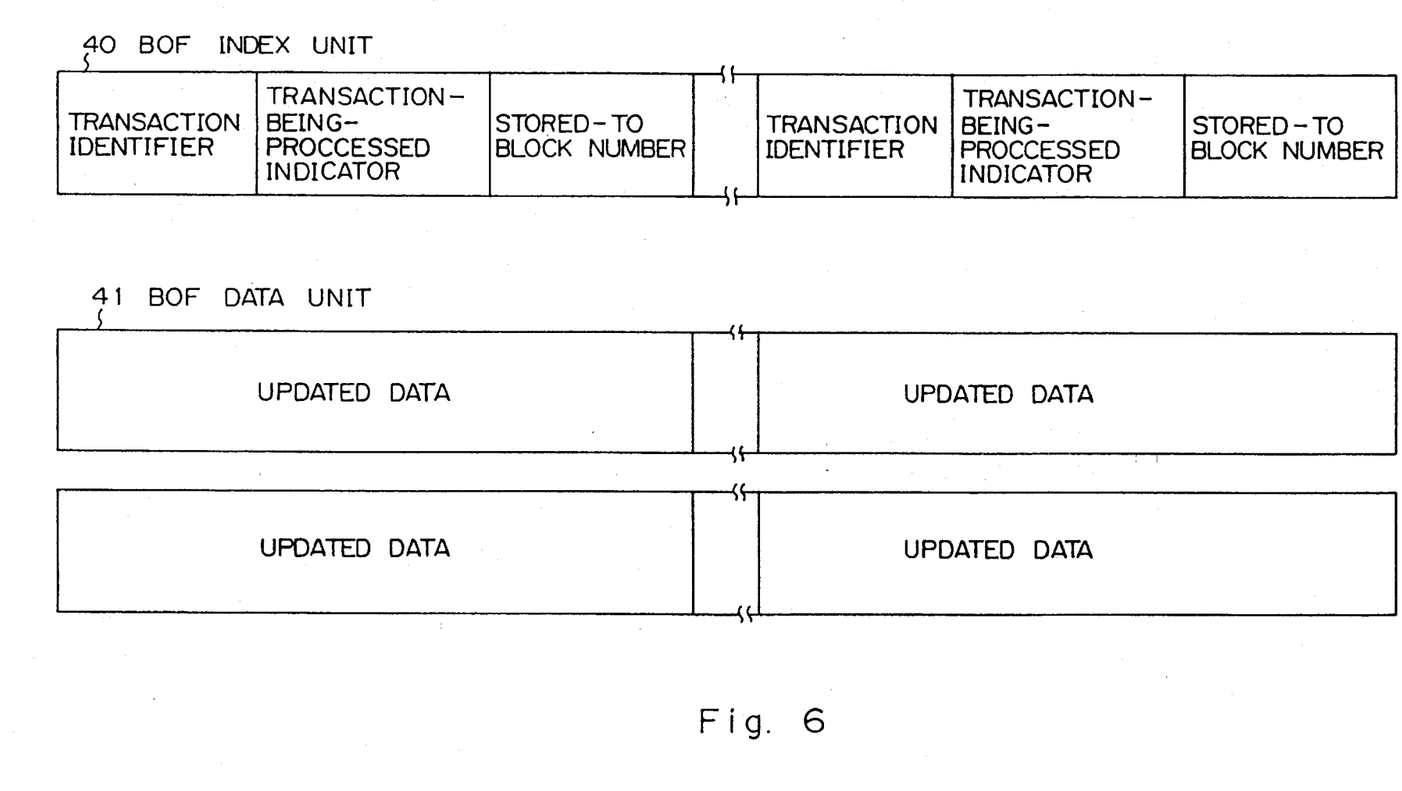
FIG. 6 shows the configuration of a backout file 4-$i$.

FIG. 5 shows the configuration of the buffers of the log data buffer 10 provided in the system storage 1a. FIG. 6 shows the configuration of the backout file 4-i provided for each computer system 2-i.

As shown in FIG. 5, the log data buffer 10 in the system storage 1a comprises an HLF buffer management table 100 and an HLF buffer pool 101. The HLF buffer management table 100 manages the use of the HLF buffer pool 101, while the HLF buffer pool 101 is shared between the computer systems 2-i to temporarily pool updated data to be written into the log file 5 after serializing them.

As shown in FIG. 5, the HLF buffer management table 100 manages, for each header, an HLF write request indicator showing a request for transmitting updated data, the leading address of a buffer being used circularly by the HLF buffer pool 101, and the leading or head address of an unused buffer by using the header. It also manages, for each entry, a next entry number, an address at which updated data are stored in the HLF buffer pool 101 (HLF buffer address), the number of records of updated data, the name of a system responsible for writing the updated data, and the written-to block number in the log file 5, that is, the destination of the updated data.

As shown in FIG. 6, the backout file 4-i comprises a BOF index unit 40 and a BOF data unit 41. The BOF data unit 41 manages updated data to be temporarily pooled for a possible fault. The BOF index unit 40 manages block numbers at which updated data are stored in the BOF data unit 41, and the transaction information on the updated data ((1) the name of a system generating updated data, (2) the identifier of a transaction generating updated data, (3) the state of a transaction when updated data are outputted, etc.). At this time, the length of a block in the BOF data unit is set to the length of a buffer of the log data buffer 10.

Figure 7:
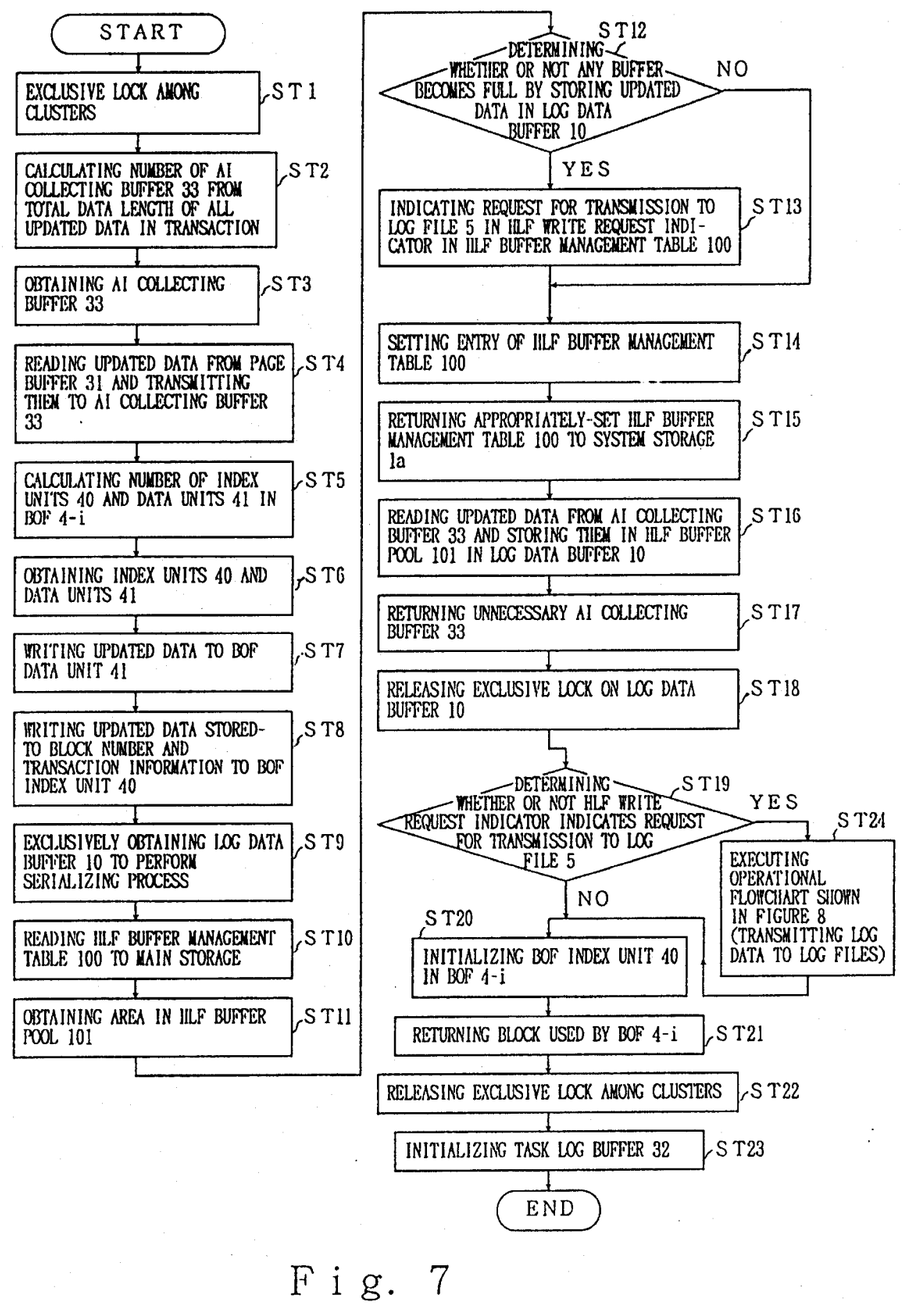
FIG. 7 is a flowchart for explaining the operation of the serializing unit.
Figure 8:
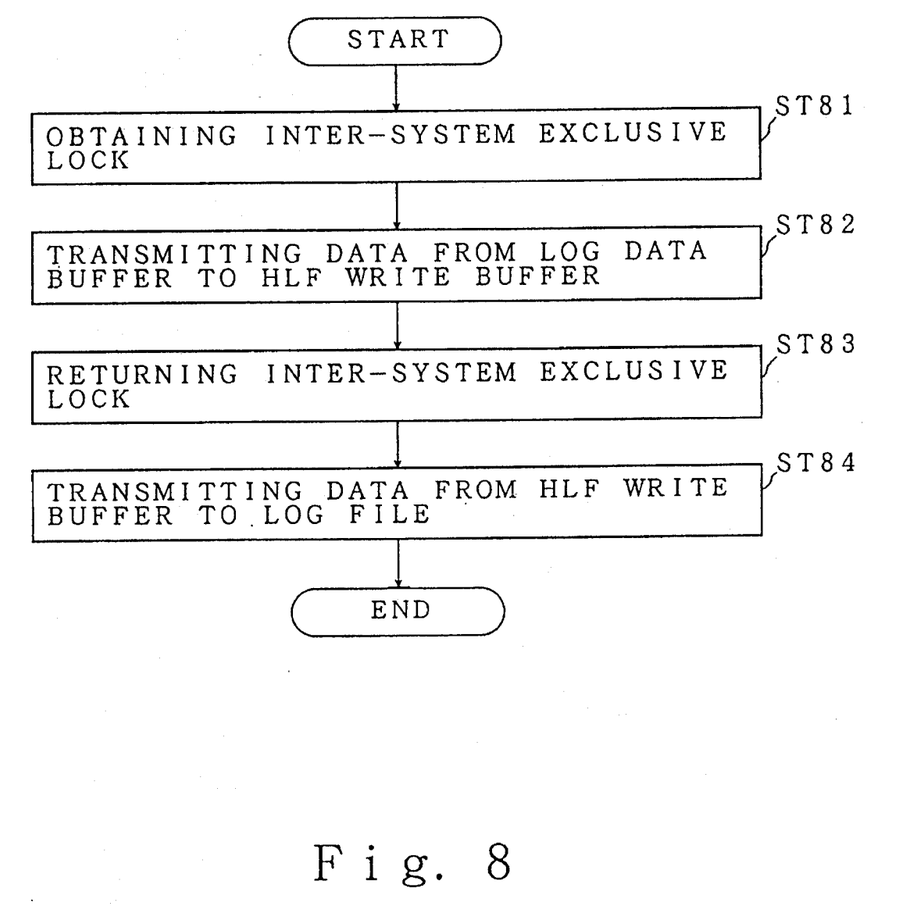
FIG. 8 is a flowchart for explaining the operation of the accumulating unit.
Figure 9:
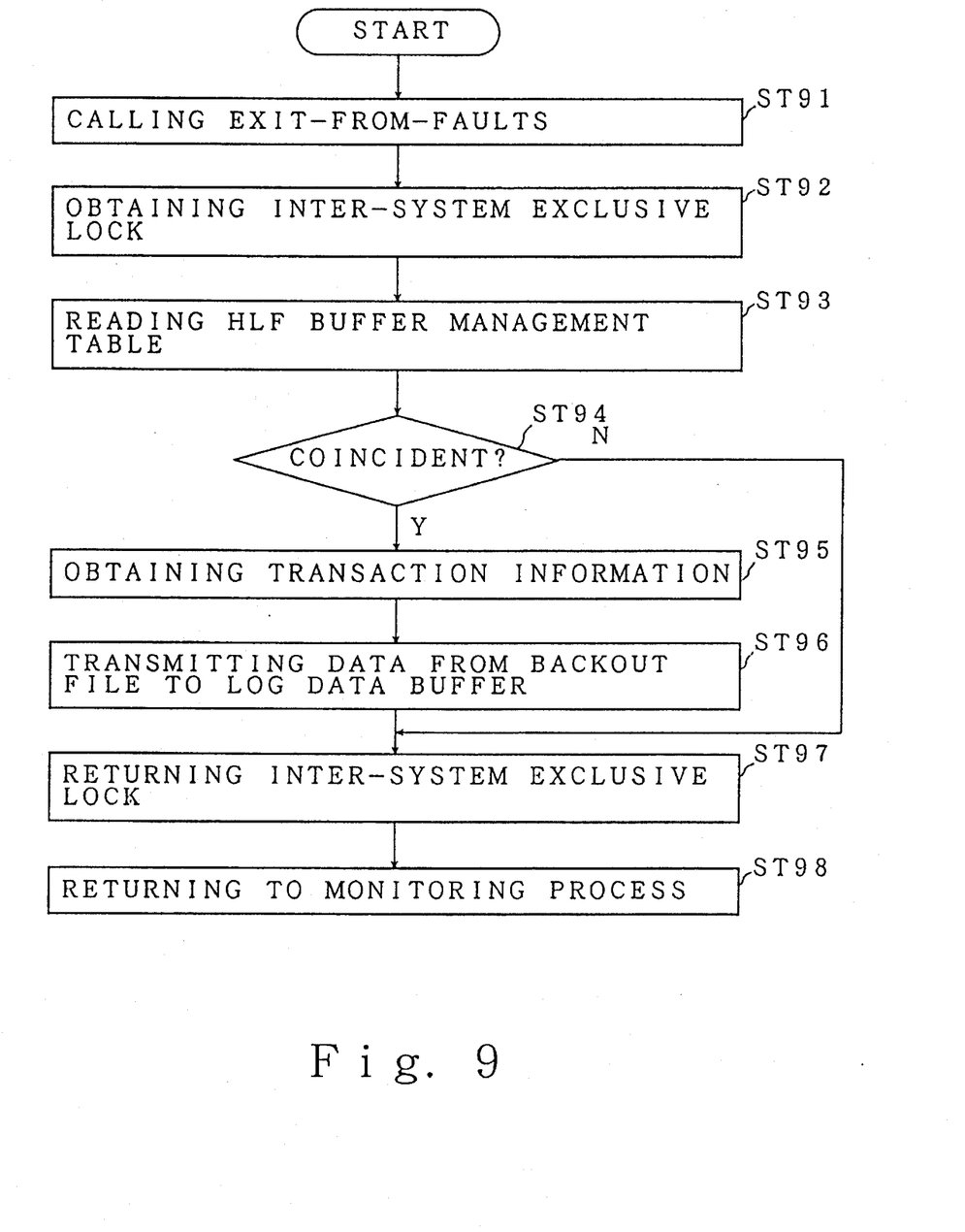
FIG. 9 is a flowchart for explaining the operation of the fault monitoring mechanism.

Next, the control process for the log file 5 is described by referring to the process flowcharts shown in FIGS. 7 and 9. FIG. 7 is an operational flowchart showing the steps performed by the serializing unit 26 shown in FIG. 1. FIG. 8 is an operational flowchart showing the steps performed by the accumulating unit 29 shown in FIG. 1. FIG. 9 is an operational flowchart showing the steps performed by a fault monitoring mechanism 36 shown in FIG. 3 and corresponding to the monitoring unit 22 and the recovery unit 23.

First, the operation of the serializing unit 26 is explained by referring to the operational flowchart shown in FIG. 7. The serializing unit 26 starts its operation when the application program 30 issues a transaction terminate macro instruction, and the process shown in the flowchart is performed.

When the application program 30 issues a transaction terminate macro instruction, the serializing unit 26 first obtains the right for an inter-cluster exclusive lock according to the conventional method (ST1). Next, it reads the data length of updated data from the control information GFCT stored in the task log buffer 32. Then, it calculates the data length of all the updated data generated in the transaction process to figure out the necessary number of the AI collecting buffers 33 to store the updated data (ST2).

Based on the number of the AI collecting buffer 33 calculated in ST2, the leading address, stored-at address, and next cell address of a block-in-use/block-unused managed by the AI collecting buffer management table 331 are updated, and the necessary number of AI collecting buffers 33 are stored (ST3). Additionally, the updated data specified by the task log buffer 32 are read from the page buffer 31, and transmitted to the AI collecting buffers 33 obtained in ST3 (ST4). After the transmission process, the updated data to be accumulated in the log file 5 are collected in the AI collecting buffer 33.

Next, the number of the BOF index units 40/BOF data units 41 of the backup files 4-i required for storing the updated data having the data length obtained in ST2 (ST5) is calculated. Then, based on the number calculated in ST5, the pool chain of blocks-in-use/blocks-unused managed by the BOF block management table 351 is updated, and the BOF index units 40/BOF data units 41 are obtained to the necessary number (ST6). The updated data stored in the AI collecting buffer 33 in ST4 are read and written to the BOF data unit 41 in the backout file 4-i obtained in ST6 (ST7), and a stored-in block number of the updated data written in ST7 and the transaction information of the updated data are written to the BOF index unit 40 of the backout file 4-i obtained in ST6 (ST8).

According to the above described process, updated data to be accumulated in the log file 5 are temporarily stored in the backout file 4-i. At this point, the processes by the serializing unit 26 and saving unit 24 have been completed. Thus, a process of serializing (arranging in time series) updated data in a complex system, as described later, can be realized. At this point, the transaction process is considered to be completed.

When updated data are temporarily saved in the backout file 4-i, the inter-system exclusive control table 11 in the system storage 1a is exclusively obtained. Then, the log data buffer 10 can be exclusively obtained (ST9). After the saving unit 24 of the computer system 2-*i* has stored the updated data in the backout file 4-*i*, the log data buffer 10 is exclusively obtained to arrange, in time series, the updated data stored in the log data buffer 10, that is, to carry out a serializing process.

Next, the HLF buffer management table 100 provided in the system storage 1*a* is read to the main storage of the computer system 2-*i* (ST10). Then, the pool chain of the blocks-in-use/blocks-unused read to the main storage and managed by the HLF buffer management table 100 is updated so that the buffers of the HLF buffer pool 101 required to store the updated data of the data length calculated in ST2 can be obtained in the necessary quantity (ST11).

Then, in storing the updated data of the data length calculated in ST2, it is determined whether or not there is a full buffer in the log data buffer 10 divided into a plurality of buffers (ST12). If it is determined that there is a full buffer (yes) in ST12, then the HLF write request indicator pointing to the full buffer in the HLF buffer management table 100 in the main storage is set to an updated data transmission request (ST13), and each entry is appropriately set in the HLF buffer management table 100 (ST14). That is, a new written-to block number in the log file 5 is calculated based on a predetermined written-to block number and the data length of updated data, and the name of the system which is responsible for a write and is a request source for a write of updated data is determined. If ST12 outputs "no" (if it is determined that no buffer is full), then the processes in and following ST14 are carried out.

After the setting process in ST14 has been completed, the updated HLF buffer management table 100 is returned to the system storage 1*a* (ST15).

Next, the updated data stored in the AI collecting buffer 33 are read and written to the HLF buffer pool 101 of the log data buffer 10 obtained in ST11 (ST16), and the AI collecting buffer 33 is returned (ST17) because it is not required after the writing process. Then, returning the inter-system exclusive control table 11 in the system storage 1*a* releases the exclusive right to use the log data buffer 10 (ST18).

Then, it is determined by referring to a write request indicator in the HLF buffer management table 100 whether or not a write to the log file 5 is required (that is, whether or not there is a full buffer in the log data buffer 10)(ST19). If a write is required (yes), the accumulating unit 29 is activated, and the process of transmitting log data to the log file 5 is carried out as indicated by the operational flowchart shown in FIG. 8 (ST24). After ST24 or if "no" in ST19, the BOF index unit 40 of the backout file 4-*i* is initialized (ST20), and the block being used in the backout file 4-*i* managed by the BOF management table 35 is returned (ST21). Then, the exclusive lock in the cluster is released (ST22), and the task log buffer 32 is initialized to terminate the process (ST23).

Thus, the process by the transmitting unit 25 in the serializing unit 26 in each computer system 2-*i* is completed. That is, the serializing process is performed such that the data in the data base updated by a transaction are written to the exclusively obtained log data buffer 10.

In this case, the log data transmitting process (ST24) is performed after ST18 if the determination (ST19) as to whether or not there is a request for the transmission of log data to the log file 5 indicates "yes". However, the processes (ST19 and ST24) loan be carried out at any time after ST18.

FIG. 8 is an operational flowchart showing the process, performed by the accumulating unit 29, of transmitting log data to the log file 5. The process is performed by the accumulating unit 29 when it is called with an updated data transmission request indicator set in the HLF write request indicator column in the HLF buffer management table 100 stored in the main storage.

First, the accumulating unit 29 exclusively obtains the log data buffer 10 (ST81) by exclusively obtaining the inter-system exclusive control table 11 in the system storage 1*a*. Next, the updated data specified by the transmission request indicator are read from the exclusively obtained log data buffer 10, and transmitted to the HLF write buffer 34 (ST82).

Then, returning the inter-system exclusive control table 11 in the system storage 1*a* releases the exclusive right to use the log data buffer 10 (ST83). Last, a written-to block number managed for updated data read from the log data buffer 10 is specified by referring to the HLF buffer management table 100 stored in the main storage, and the updated data are transmitted to the storage area in the log file 5 according to the written-to block number assigned to the updated data (ST84).

Thus, when the accumulating unit 29 in each computer system 2-*i* detects that the log data buffer 10 in the system storage 1*a* is full, it transmits the log data written in the log data buffer 10 to the log file 5 asynchronously with a transaction.

The log data for the data base 3 shared between the computer systems 2-*i* in a complex system are stored in the log file 5 also shared between the computer systems 2-*i*, thus terminating the process of updating the data base 3.

FIG. 9 is an operational flowchart showing the recovery process performed when the computer systems 2-*i* in a complex system generate a fault and become inoperative. The process is started when the fault monitoring mechanism 36 (the monitoring unit 22 shown in FIG. 1) of one computer system 2-*i* in the complex system detects a fault in the other computer system 2-*i* in the complex system.

When the fault monitoring mechanism 36 of the operable computer system 2-*i* detects a fault in the other computer system 2-*i*, it calls the exit-from-faults section in the log data management mechanism (the general name of the section for managing log data)(ST91). Next, it exclusively obtains the log data buffer 10 (ST92) by exclusively obtaining the inter-system exclusive control table 11 in the system storage 1*a*, and reads the HLF buffer management table 100 stored in the system 1*a* to the main storage in the operable computer system 2-*i* (ST93).

Then, it is determined whether or not the defective computer system 2-*i* corresponds to the system responsible for a write (its name is stored in the HLF buffer management table 100 in the main storage) (ST94). If they are coincident (yes), that is, if it is determined that a fault is detected in the computer system 2-*i* in transmitting updated data from the AI collecting buffer 33 to the log data buffer 10, then the updated data interrupted during the transmission from the log data buffer 10 are read, and the transaction information is obtained from the control information GFCT in the read updated data (ST95).

The BOF index unit 40 in the backout file 4-*i* is stored in the main storage and referred to so that the storage area for the updated data can be specified in the backout file 4-*i* according to the transaction information obtained in ST95. Using a communication mechanism, the updated data of the backout file 4-*i* stored in the specified storage area are transmitted to the log data buffer 10 in the system storage 1*a* (ST96). That is, the updated data interrupted during the transmission are transmitted again to the log data buffer 10.

Then, returning the inter-system exclusive control table 11 in the system storage 1a returns the log data buffer 10 (ST97), and control is returned to the monitoring process performed by the fault monitoring mechanism 36 (ST98).

On the other hand, if it is determined in ST94 that the system responsible for a write does not match the defective computer system (no), that is, if it is determined that the defective computer system 2-$i$ is not the computer system 2-$i$ currently transmitting updated data, then it is not necessary to again transmit again the log data. Accordingly, the process in ST97 is performed immediately. That is, returning the inter-system exclusive control table 11 in the system storage 1a returns the log data buffer 10 (ST97), and control is returned to the monitoring process (ST98).

Even if a fault arises in a computer system currently transmitting processed data, the updated data can be recovered by the process performed by the fault monitoring mechanism 36.

As described above, the present invention comprises, in the system storage 1a, the log data buffer 10 to be shared among clusters, and uses an inter-cluster exclusive lock in sequentially writing to the log data buffer 10 the updated data of the data base 3. Thus, the updated data can be appropriately serialized.

According to the present invention, updated data are saved in the backout file 4-$i$ before transmitting updated data in the log data buffer 10 by providing a backout file 4-$i$ for each cluster. Consequently, a transaction can be completed at a high speed, and a normal operation is restored by transmitting again updated data in the backout files 4-$i$ even if a fault has arisen during the transmission of updated data.

If the log data buffer 10 in the system storage is full, the performance of a transaction can be prevented from being deteriorated by transmitting updated data to the log file in asynchronizing with the transaction process.

At this time, the transmission of the updated data from the log data buffer 10 to the log file 5 is assigned not to a specific cluster, but to a cluster which has detected the full log data buffer 10. Thus, the concentration onto a specific cluster can be successfully prevented.

The present invention discloses the configuration including the system storage 1a. However, it is obvious that the log data buffer 10 can be stored in the DASD and the exclusive control by the inter-system exclusive control table 11 can be realized by an inter-cluster communication mechanism in a case in which a complex system cannot comprise the system storage 1a.

What is claimed is:

1. A log file control system used in a complex system comprising a plurality of computer systems connected for communications in said complex system for performing transactions, a data base shared among said computer systems, and a high-speed storage unit shared among said computer systems, said log file control system comprising:

a log file, shared among said computer systems and coupled to said data base, for managing log data of said data base;

a log data buffer in said high-speed storage unit for temporarily storing the log data;

an inter-system exclusion control table in said high-speed storage unit for controlling an exclusion lock on said log data buffer;

a backout file, provided for each computer system, for temporarily the storing log data to be transmitted to said log data buffer; and log file control means in each of said computer systems for controlling said log file, said backout file, said log data buffer, and said inter-system exclusive control table so that said log data is transmitted to said log file asynchronously when a transaction is performed in at least one of said computer systems; wherein said log file control means comprises saving means for completing a transaction by storing log data in said backout file at the end of a transaction process so that a succeeding transaction can be started.

2. The log file control system according to claim 1, wherein said log file control means comprises serializing means for serializing log data transmitted from each of said backout file of each of said plurality of computer systems, to said log data buffer after obtaining the exclusion lock on said log data buffer according to said inter-system exclusive control table.

3. The log file control system according to claim 1, wherein said log file control means comprises accumulating means for transmitting log data, requested to be transmitted to said log file after obtaining the exclusive lock on said log data buffer according to said inter-system exclusive control table, asynchronously with the transaction in at least one of said computer systems when a request for transmitting data to said log file is detected in said log data buffer.

4. The log file control system according to claim 1, wherein said log file control means comprises:

saving means for completing a transaction by storing log data in said backout file at the end of a transaction process so that the succeeding transaction can be started;

serializing means for serializing log data transmitted from said backout file of each of said plurality of computer systems to said log data buffer after obtaining an exclusive lock on said log data buffer according to said inter-system exclusive control table; and accumulating means for transmitting log data requested to be transmitted to said log file after obtaining an exclusive lock on said log data buffer according to said inter-system exclusive control table in asynchronizing with the transaction at least one of said computer systems when a request for transmitting data to said log file is detected in said log data buffer.

5. The log file control system according to claim 4, wherein said accumulating means transmits log data requested to be transmitted to said log file by obtaining an exclusive lock on said log data buffer according to said inter-system exclusive control table in asynchronizing with the succeeding transaction or any transaction of other computer systems when a full buffer exists in said log data buffer.

6. The log file control system according to claim 1, wherein said high-speed storage unit comprises a semiconductor memory device.

7. The log file control system according to claim 1, wherein each of said computer systems comprises fault monitoring means for controlling such that an operable computer system can exclusively obtain said log data buffer according to said inter-system exclusive control table, read said log data from the backout file containing data for a computer system in fault, and transmit said log data to said log data buffer when the computer system in fault becomes inoperative during the transmission of said log data to said log data buffer.

* * * * *

UNITED STATES PATENT AND TRADEMARK OFFICE
CERTIFICATE OF CORRECTION

PATENT NO. : 5,455,947
DATED : October 3, 1995
INVENTOR(S) : SUZUKI et al.

It is certified that error appears in the above-indentified patent and that said Letters Patent is hereby corrected as shown below:

Col. 4, line 32, after "2)" insert --,--.
Col. 5, line 9, after "2-i" insert --,--;

Col. 6, line 56, change "$\alpha$" to --$\beta$--;
    line 63, after "4" (first occurrence) insert --A--.
Col. 9, line 65, change "loan" to --can--.
Col. 11, line 10, delete "again".

Signed and Sealed this

Second Day of April, 1996

Attest:

BRUCE LEHMAN

Attesting Officer     *Commissioner of Patents and Trademarks*

UNITED STATES PATENT AND TRADEMARK OFFICE
CERTIFICATE OF CORRECTION

PATENT NO. : 5,455,947
DATED : October 3, 1995
INVENTOR(S) : Hitoshi SUZUKI, et al.

It is certified that error appears in the above-indentified patent and that said Letters Patent is hereby corrected as shown below:

On the Title page, item [75], delete "both", and insert therefor --Masayuki: Tada, all--.

Signed and Sealed this

Eighteenth Day of March, 1997

*Attest:*

BRUCE LEHMAN

*Attesting Officer*       *Commissioner of Patents and Trademarks*